Figure 1:
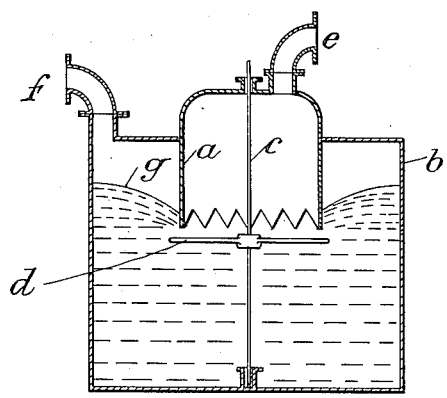

W. FELD, DEC'D.
K. E. MARKEL, ADMINISTRATOR.
APPARATUS FOR BRINGING LIQUIDS AND GASES OR VAPORS INTO CONTACT WITH EACH OTHER.
APPLICATION FILED JULY 18, 1914.

1,110,914.

Patented Sept. 15, 1914.

4 SHEETS—SHEET 1.

WITNESSES

INVENTOR
WALTHER FELD, DEC'D.
KARL EMIL MARKEL,
Administrator.
BY
his ATTORNEYS

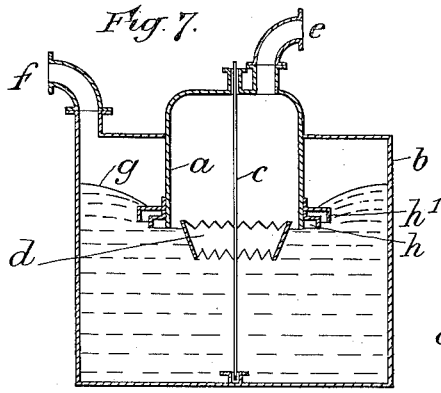
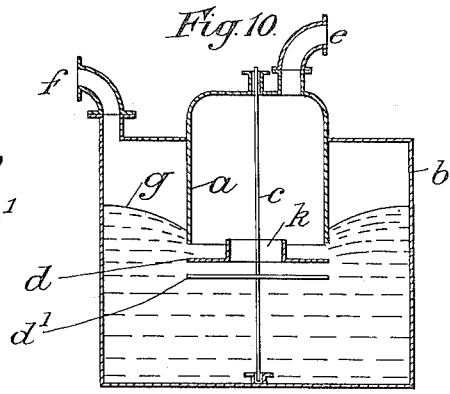
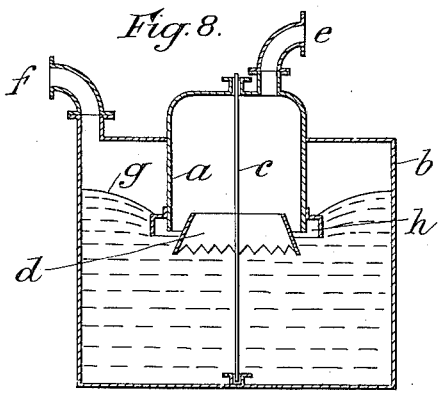
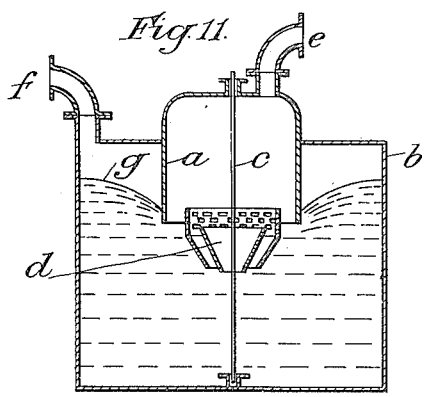
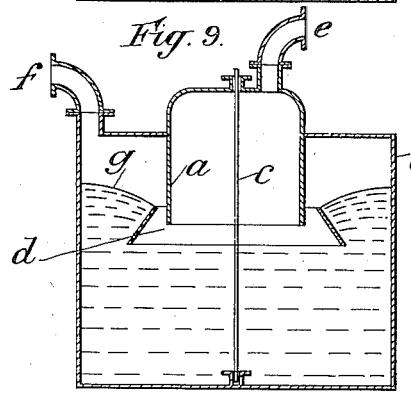
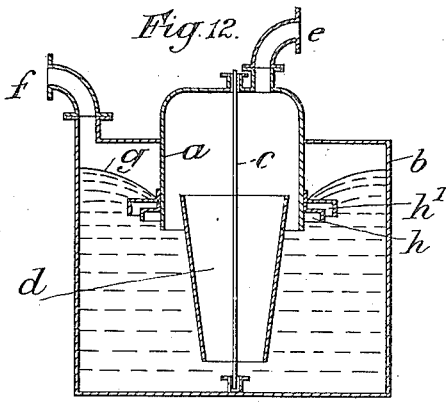

W. FELD, DEC'D.
K. E. MARKEL, ADMINISTRATOR.
APPARATUS FOR BRINGING LIQUIDS AND GASES OR VAPORS INTO CONTACT WITH EACH OTHER.
APPLICATION FILED JULY 18, 1914.

1,110,914.

Patented Sept. 15, 1914.

4 SHEETS—SHEET 3.

INVENTOR:
WALTHER FELD, DEC'D.
KARL EMIL MARKEL,
Administrator
BY his Attorneys.

WITNESSES

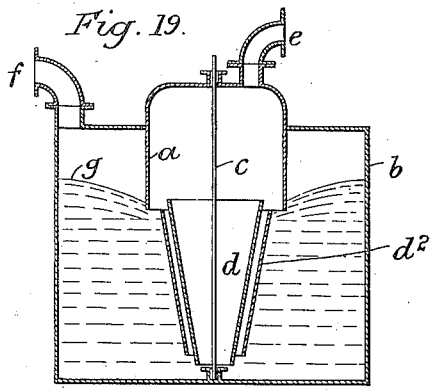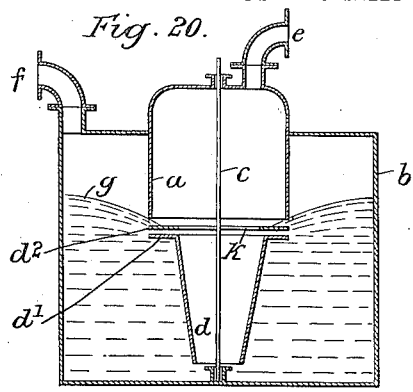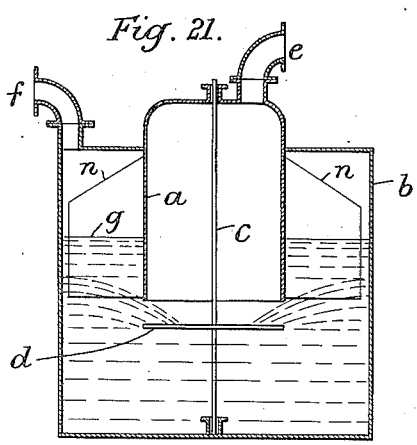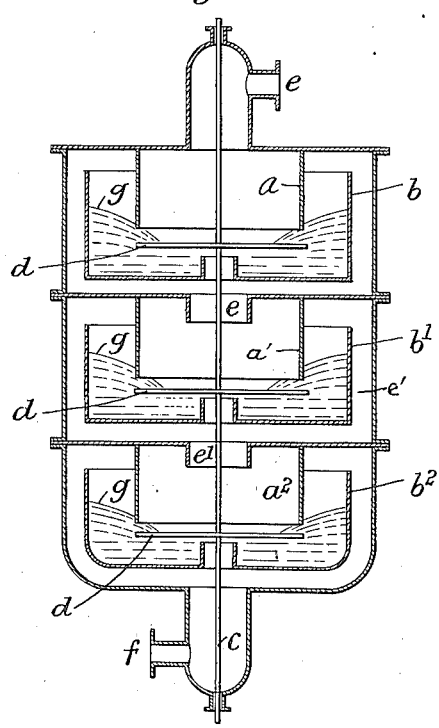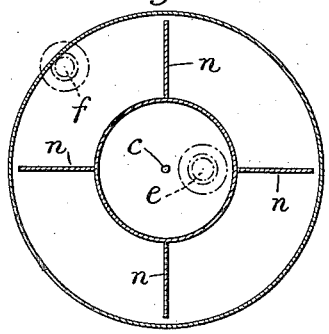

UNITED STATES PATENT OFFICE.

WALTHER FELD, DECEASED, LATE OF LINZ, GERMANY, BY KARL EMIL MARKEL, ADMINISTRATOR, OF LONDON, ENGLAND.

APPARATUS FOR BRINGING LIQUIDS AND GASES OR VAPORS INTO CONTACT WITH EACH OTHER.

1,110,914.  Specification of Letters Patent.  Patented Sept. 15, 1914.

Application filed July 18, 1914.  Serial No. 851,805.

*To all whom it may concern:*

Be it known that I, KARL EMIL MARKEL, a subject of the King of Great Britain, residing at 20 Queens Gate Terrace, London, England, administrator of the estate of WALTHER FELD, late a subject of the German Emperor, deceased, who invented new and useful Improvements in Apparatus for Bringing Liquids and Gases or Vapors into Contact with Each Other, do declare the following to be a specification.

In the treatment of gases with liquids, for the purpose of removing constituents from the gases, for instance, for removing ammonia, hydrogen sulfid, or cyanogen compounds from gases resulting from dry distillation, and also in saturating liquids with gases, or vapors, it is necessary to bring into intimate contact the smallest particles of the liquid and gases, or vapors, and, with the object of effecting this, a rotating bell has been used, this bell dipping into the liquid, and the gases, or vapors, being introduced under the said bell, the object being to impart, by this means, rotary motion to the gases, or vapors, with the intention of atomizing them in the liquid. The gases, or vapors, were introduced either from above, or by a pipe rising through the liquid into the space under the rotating bell. In either case rotary motion was imparted to the gases, or vapors, while the liquid was regarded as being kept at rest, but as a matter of fact in the said operation the liquid also moved and this in an undesirable manner through being forced away from the edge of the bell under the action of centrifugal force, so that the bell did not dip as deeply into the liquid as it did before the bell was rotated, and the gases, or vapors, did not properly pass through, and come into contact with, the liquid, but glided over its upper surface.

The deceased found that the intimate contact of gases, or vapors, and liquids can be obtained in a very simple and efficient manner, if a stationary bell, or stationary bells, be used and the liquid under, and surrounding, the bell, has rotary motion imparted to it, so that the gas issuing from the bell, or bells, is drawn into the rotating liquid and atomized to form more, or less, minute bubbles in the liquid. When the liquid is not rotated (as is the case in the ordinary way) the gases, or vapors, meet with a resistance corresponding to the depth to which the bell is immersed. The deceased found that this resistance decreases when the liquid is set in rotation in accordance with this invention. Even if the device which imparts rotation to the liquid be arranged at some considerable distance below the bell, or bells, the gases, or vapors, are drawn into the liquid up to the said device, and even below it, while, at the same time, the upper surface of the liquid surrounding the bell, or bells, rises above its level when stationary, and the deceased found that the greater the speed of rotation of the liquid, the less is the resistance offered to the penetration of the gases, or vapors, and the pressure of the gases, or vapors, atomized in the liquid is thereby considerably increased so that some of the bubbles of gas, or vapor, are even driven down to the bottom of the liquid chamber.

Any suitable rotatable device can be used for the purpose of giving the required motion to the liquid. For instance a plain circular disk rotated under the stationary bell by a concentric shaft may be used, and such an arrangement has the advantage that the required action is obtained with an expenditure of power which is considerably less than that required for rotating a bell. When the disk rotates the liquid is forced to the edge of the disk, and the gas, or vapor, is drawn in from the bell up to the disk and atomized into the liquid. If the middle of the disk be provided with a concentric opening, gas, or vapor, from the bell, above the disk is, in consequence of the centrifugal force, drawn in and pressed below the disk into the liquid and very finely atomized below the disk and at the edge thereof, and the gas, or vapor, penetrates into the liquid, to a lower level than the level to which the bell dips, that is to say, the pressure of the gas, or vapor, drawn into the liquid is increased by the rotation of the liquid and the efficiency of the action is increased, less power being required for working the air pump, aspirator, fan, injector, or other device forcing in the gas, or vapor. If the gas or vapor, inlet to the bell, be closed, a vacuum is produced under the bell, or the equivalent, amounting, according to the velocity of the liquid, to say from 100, to 200, millimeters of water. If the central opening in the disk, or the outer edge of the disk, or both, be provided with a cylindrical, or conoidal projecting rim, the atomization of the gas, or vapor, caused by the suction is still further increased. A further advantage of this invention is that the device for imparting rotary movement to the liquid can be so made that it constantly brings liquid from the lowest part of the liquid-container to the upper surface and thereby constantly brings fresh particles of liquid into contact with the gases, or vapors, and by a combination of this device with the aforesaid disk the desired action is further considerably increased.

A further increase of the desired action is obtained if the lower edge of the bell and the lower, or upper edge, or both the lower, and upper edges, of the rotating device be perforated, or notched. Disks with perforations in them, also increase the efficiency of the action.

The accompanying drawings illustrate, in vertical section, various forms of apparatus according to this invention.

In all the figures $a$ indicates the stationary bell, $b$ indicates the vessel containing the liquid, $c$ indicates the vertical shaft, on which is carried the rotating device $d$, $e$ indicates the pipe for supplying gas to the bell, and $f$ indicates the gas outlet pipe, while $g$ indicates the upper surface of the liquid.

This invention is however not limited to the details illustrated as they may be varied without departing from the nature of the invention.

Figure 2:
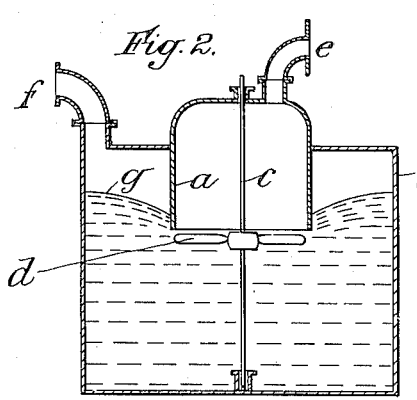

Figure 1 shows a rotating device with stirring arms $d$ arranged diametrically opposite each other with the lower edge of the bell notched, while, in the arrangement shown in Fig. 2, the bell is not notched, and screw-propeller blades are shown in place of the plain arms.

Figure 3:
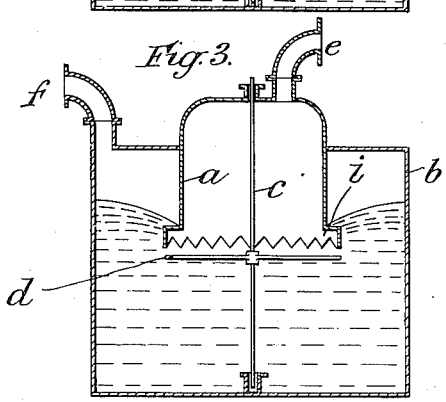

In Fig. 3 the rotating device consists of a plain horizontal disk and the bell $a$, is notched and is provided, at its lower part, with an annular inverted trough, or second concentric bell, $i$.

Figure 4:
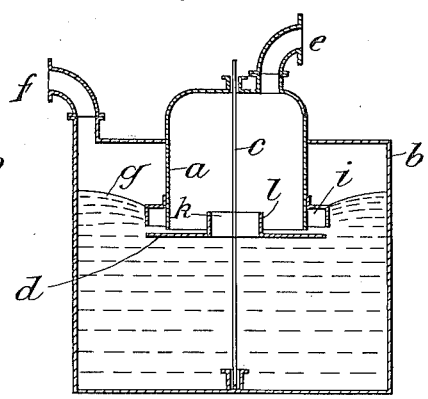
Figure 5:
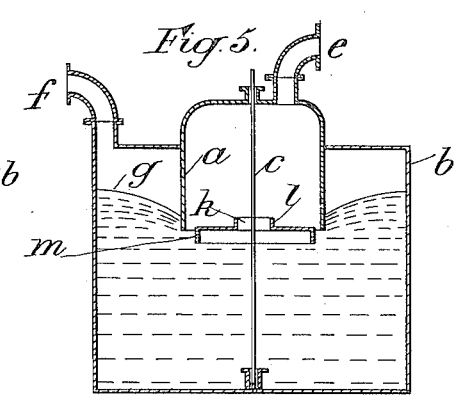

Fig. 4 shows a modification in which a second inverted trough, or small bell, is attached to the outer side of the bell $a$, and there is a central opening $k$, in the disk $d$, which opening is provided with an upward flange $l$, for the purpose of increasing the suction effect. Fig. 5 shows such a disk provided on the outer periphery with a second flange $m$, by which the suction effect is further increased.

Figure 6:
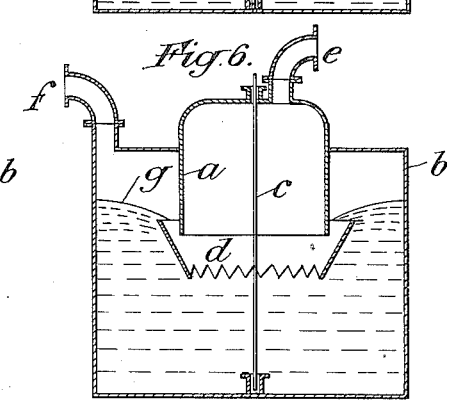
Figure 13:
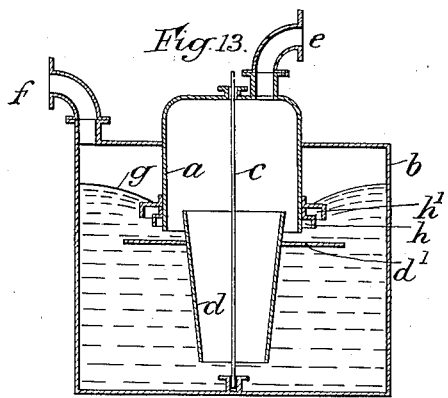

In the arrangement shown in Fig. 6 the device $d$, consists of an inverted frustum of a cone with zig-zag notches at the lower end.

In the arrangement shown in Fig. 7, the bell $a$, is provided with two concentric inverted troughs, or small bells $h$, $h^1$, for the purpose of repeatedly atomizing, in the liquid, the gases, or vapors, which have collected under these bells. The devices $d$, are shown as being notched on both edges. In this arrangement the said inverted troughs, or concentric bells, may dip into the liquid, to the same, or different, depths, but it is generally preferred that the outward concentric inverted trough, or bell, shall dip to a less depth into the liquid than does the inward bell.

In the arrangement shown in Fig. 8 the rotating device consists of a frustum of a cone having notches at its lower edge, and with one additional inverted trough, or small bell, $h$.

In Fig. 9 the device $d$, is a frustum of a cone which surrounds the exterior of the lower edge of the bell $a$.

In the arrangement Fig. 10 a horizontal rotatable disk $d$, is provided at its center with an opening $k$, and below it is a complete disk $d'$.

Fig. 11 shows an arrangement wherein the rotating device $d$, consists of a frustum of a cone inside another frustum of a cone with an upper perforated cylindrical part.

Figure 16:
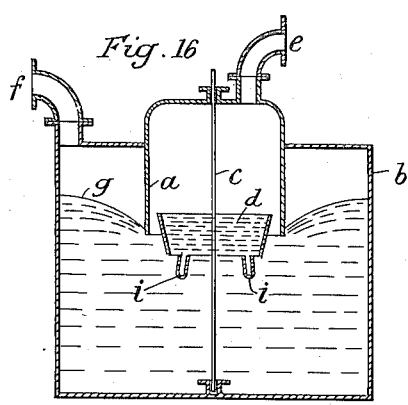
Figure 14:
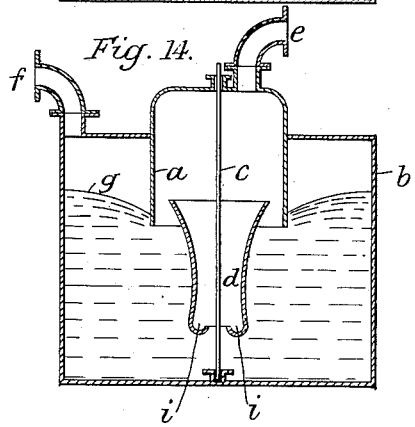
Figure 17:
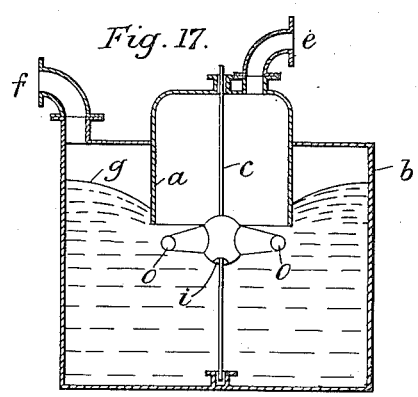
Figure 15:
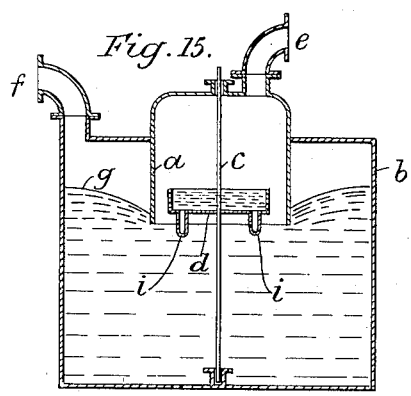
Figure 18:
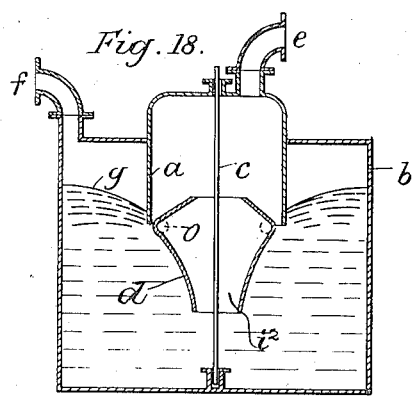

The arrangements shown in Figs. 12 to 20 comprise rotating devices which simultaneously draw the liquid from the lower part of the liquid-containing vessel, and raise it to the upper level and partly atomize the gases, or vapors, in a reverse direction in the bell, or bells, wherein, by rotating on the inner surface of the bell, or bells, the liquid presents a large and constantly changing area to the gases, or vapors. In the arrangement shown in Fig. 12, the rotating device $d$, consists of an inverted frustum of a cone, while in Fig. 13 the suction of the gases, or vapors, by the part $d$ is increased by a horizontal disk $d'$, carried by the part $d$. Fig. 14 shows the rotating device $d$, as consisting of a trumpet-like body open at its upper end and having, at its lower end, inlets, or pipes, opening in such a direction that, during rotation the liquid is forced thereinto, the said liquid rising into the said device and being whirled out of the upper flared end thereof. In Figs. 15 and 16 the rotating device $d$, consists of troughs, or trays, open at the top and provided at the bottom with two, or more, pipes $i$ through which the liquid is forced in consequence of the rotation of the device. If the walls of the troughs be perforated, the raised liquid will be atomized through the perforations. In the arrangement shown in Fig. 17 the rotating device $d$, consists of a spherical body which, at its lower part, is provided with an opening $i'$, drawing in the liquid, and at the side it is provided with two, or more, cylindrical, or conical, pipes having openings $o$, by which the liquid is atomized laterally. In the arrangement shown in Fig. 18 the device $d$, consists of a body which comprises a lower trumpet-shaped part and a converging upper part having the shape of an inverted funnel. At the junction of these two parts are openings $o$. The lower trumpet-shaped portion is open at its lower and narrower part $i^2$. The rotation of the device causes liquid to be drawn in at the lower part and to be whirled out at the upper part through the openings $o$. The upper part above the openings may be either open, or closed. Fig. 19 shows an arrangement like Fig. 12 but with the rotating body $d$, formed of two frusta of cones $d$ and $d^2$ and Fig. 20 shows the device $d$, as consisting of a frustum of a cone $d$, provided at its upper edge with a horizontal flange $d'$, and between this and the bottom edge of the bell $a$, is an annulus $d^2$. On the rotation of the combined device the gas, or vapor, from the bell $a$, is sucked into the opening $k$, in the annulus $d^2$, and atomized between the parts $d'$ and $d^2$, and, at the same time, liquid is drawn in from the lower part of the vessel $b$, through the funnel $d$, and mixed, between the parts $d'$ and $d^2$, with the atomized gas, or vapor.

In the arrangement shown in vertical section in Fig. 21 and in plan in Fig. 22 the bell $a$, is provided externally with wings, or projections, $n$, which neutralize the rotation of the liquid around the bell. This arrangement is suitable principally in cases where the dip of the bell is small, as it prevents bubbles of gas, or vapor from rising in an unatomized state at the edge of the bell. Such wings, or projections, can be arranged at the lower part only of the bell if desired, and, if desired, they need not dip into the liquid to such an extent as to prevent the rotation of the liquid under the bell.

Fig. 23 shows several of the improved devices arranged one above the other in one apparatus so that the gases, or vapors, in their downward course are treated repeatedly with the liquid. The gases, or vapors, entering at $e$, the topmost stationary bell, are drawn into the liquid by the rotation of the upper disk $d$, and escape at the upper edge of the vessel $b$, and pass downward and through the vessel $e$, into the second bell $a'$ and so on through the vessel $b'$ passage $e'$, bell $a^2$, and vessel $b^2$, and they finally escape below the lowermost vessel $b^2$, through the outlet $f$. If the gases, or vapors, are to be atomized to an especially fine state of division in the liquid, it is advisable to make the disks $d$, a diameter the same as that of the gas bells, or the equivalents.

What I claim is—

1. In apparatus for bringing liquids and gases into contact with each other, the combination with a liquid-containing vessel, of a gas supply bell dipping into the liquid and a device rotatable in the liquid in proximity to the lower part of the said bell to cause gas to be drawn from the said bell and atomized in the liquid, substantially as described.

2. In apparatus for bringing liquids and gases into contact with each other, the combination with a liquid containing vessel, of a stationary gas supply bell dipping into the liquid and a device rotatable in the liquid in proximity to the lower part of the said bell to cause gas to be drawn from the said bell and atomized in the liquid, substantially as described.

3. In apparatus for bringing liquids and gases into contact with each other, the combination with a liquid containing vessel, of a stationary gas supply bell dipping into the liquid, an auxiliary bell surrounding said first mentioned bell and a device rotatable in the liquid in proximity to the lower part of said bells to cause gas to be drawn therefrom and atomized in the liquid.

4. In apparatus for bringing liquids and gases into contact with each other, the combination with a liquid-containing vessel, of a gas supply bell dipping into the liquid and a device rotatable in the liquid in proximity to the lower part of the said bell to cause gas to be drawn from the said bell and atomized in the liquid, and means in combination with said rotating device tending to circulate the liquid from the lower portion of the vessel toward the upper surface thereof, substantially as described.

5. In apparatus for bringing liquids and gases into contact with each other, the combination with a liquid-containing vessel, of a gas supply bell dipping into the liquid and a device rotatable in the liquid in proximity to the lower part of the said bell to cause gas to be drawn from the said bell and atomized in the liquid, together with projections on the edge of the said bell, substantially as described.

6. In apparatus for bringing liquids and gases into contact with each other, the combination with a liquid containing vessel, of a gas supply bell dipping into the liquid and a device rotatable in the liquid in proximity to the lower part of the said bell to cause gas to be drawn from the said bell and projected into the liquid and means for atomizing the same into the liquid.

7. In apparatus for bringing liquids and gases into contact with each other, the combination with a liquid containing vessel, of a gas supply bell dipping into the liquid and a device rotatable in the liquid in proximity to the lower part of the said bell to cause gas to be drawn from the said bell and projected into the liquid and means for effecting an intimate mixture of said gas and liquid in finely divided condition, for the purpose described.

In testimony whereof I have signed my name to this specification in the presence of two subscribing witnesses.

KARL EMIL MARKEL,
*Administrator of the estate of Walther Feld, deceased.*

Witnesses:
GILBERT FLETCHER TYSON,
CHARLES HENRY BAKER.